April 13, 1943.                R. ZUAZUA                    2,316,382
           COMBINATION ELECTRIC TESTER, LAMP AND SMOKER'S OUTFIT
                    Filed Dec. 29, 1941          3 Sheets-Sheet 1

INVENTOR.
Raymond Zuazua
BY
ATTORNEY

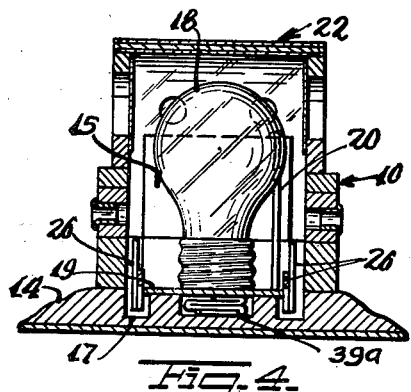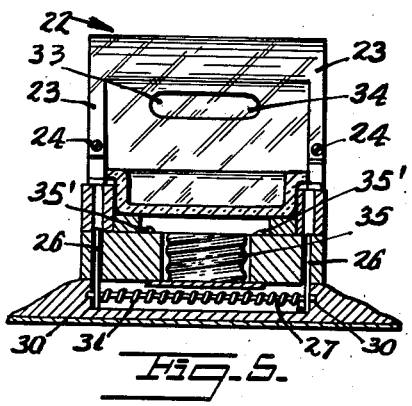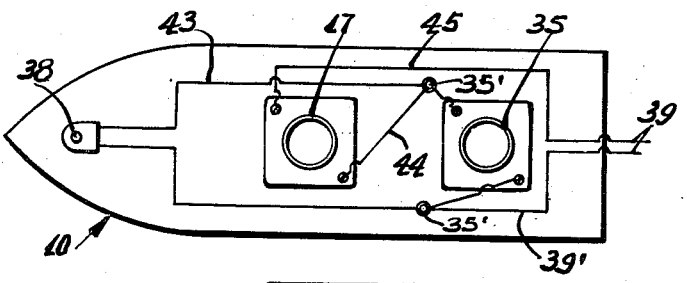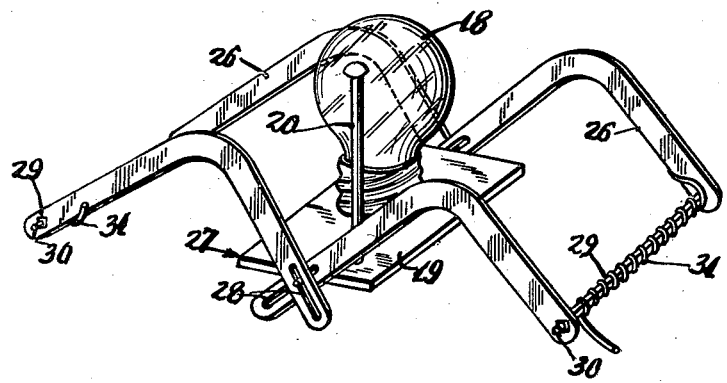

April 13, 1943.  R. ZUAZUA  2,316,382
COMBINATION ELECTRIC TESTER, LAMP AND SMOKER'S OUTFIT
Filed Dec. 29, 1941  3 Sheets-Sheet 3

INVENTOR.
Raymond Zuazua
BY
ATTORNEY

Patented Apr. 13, 1943

2,316,382

UNITED STATES PATENT OFFICE 2,316,382

COMBINATION ELECTRIC TESTER, LAMP, AND SMOKER'S OUTFIT

Raymond Zuazua, New York, N. Y.

Application December 29, 1941, Serial No. 424,778

6 Claims. (Cl. 240—2)

This invention relates to new and useful improvements in a combination electric tester, lamp and smoker's outfit.

More specifically, the invention proposes to characterize the article by a base of a specific design, such as a model boat, and supporting various smoker's articles such as an ash tray, package of cigarettes, and the like.

Still further the invention proposes to provide the base with certain openings in which lamp sockets are located. An arrangement is provided whereby one of these lamp sockets may be used for testing lamps. Another arrangement is provided whereby one of these lamp sockets may be used for an illumination lamp.

The invention further contemplates a novel arrangement whereby the illumination lamp may be extended when desired and then a lamp shade may be engaged thereon for converting the article to an ornamental lamp.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is a transverse sectional view taken on the line 4—4 of Fig. 3.

Fig. 5 is a transverse sectional view taken on the line 5—5 of Fig. 3.

Fig. 6 is a schematic wiring diagram of the device.

Fig. 9 is a plan view of Fig. 8.

Fig. 10 is a view of the lamp socket supporting means.

Figure 1:
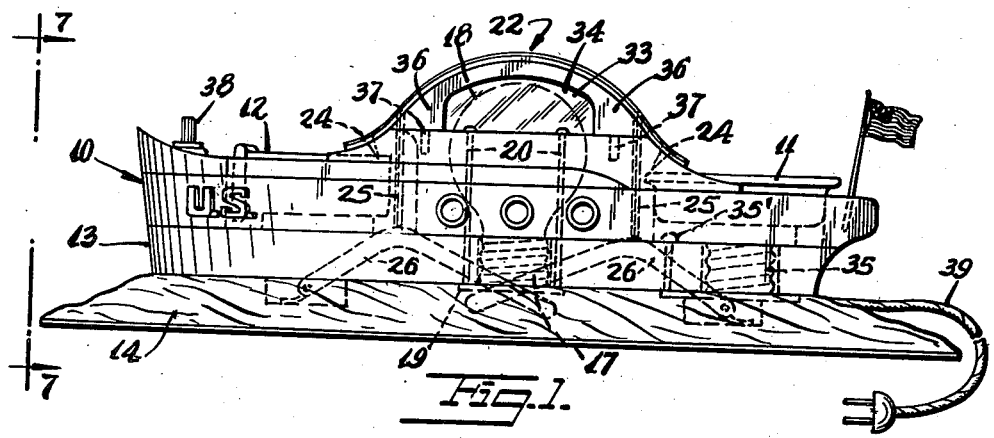
Fig. 1 is a side elevational view of an article constructed in accordance with this invention.

The combination electric tester, lamp and smoker's outfit, in accordance with this invention, includes a base 10 for supporting various smoker's articles, such as an ash tray 11 and a package of cigarettes 12. The base 10 may be of various ornamental designs. As illustrated on the drawings it comprises a representation of a boat 13 on a pedestal 14 which is a representation of the sea. The base 10 has a centrally located opening 15 and an end opening 16 which are extended downwards from the top. A lamp socket 17 and lamp 18 are extendably mounted in the central opening 15. The lamp socket 17 is attached on a plate 19 which is vertically guided by several posts 20 having heads 21 to limit the upward motion of the plate 19.

A light controlling shade 22 is removably mounted on the body 10 over the central opening 15 and indirectly holds the lamp socket 17 in a downward position. More specifically, the shade 22 has side lugs 23 which are attached on the base 10 by screws 24. The shade 22 also has a pair of downwardly directed portions 25 which engage against arms 26 for holding these arms downwards. The arms 26 are connected with the plate 19 and thus said plate is held in its lowered position.

Figure 2:
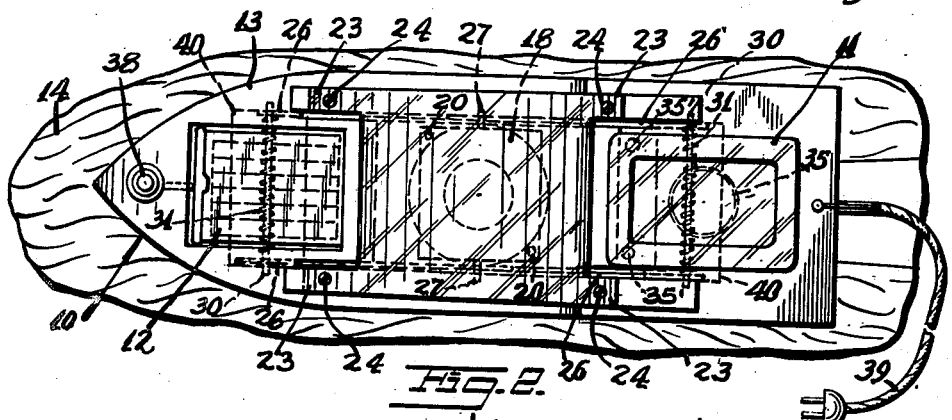
Fig. 2 is a plan view of Fig. 1.
Figure 3:
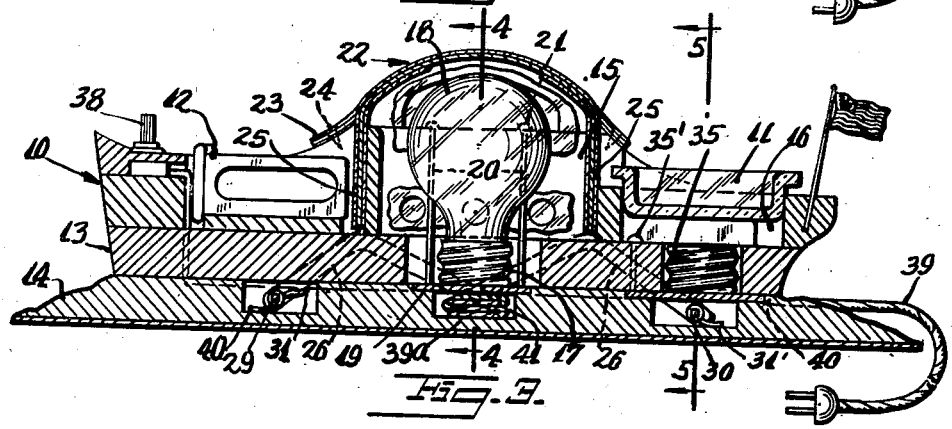
Fig. 3 is a longitudinal sectional view taken on the line 3—3 of Fig. 2.

The plate 19 is provided with a pair of pins 27 which project from its sides. These pins 27 pass through slots 28 formed in the inner ends of the arms 26. The outer ends of the arms 26 are mounted upon a pair of transverse square rods 29. These square rods have rounded ends 30 engaging the material of the base 10 by which the arms 26 are pivotally supported. Each square rod 29 is provided with a coaxially mounted spring 31 which acts between the base 10 and one of the arms thereon for resiliently urging the arms 26 into elevated positions. However, the portions 25 of the shade 22 engage the arms 26, see particularly Figs. 2 and 3, for holding them in their lowered positions. The shade 22 is formed with several window openings 33 which are covered by colored transparent or translucent material 34 through which the rays of the lamp 18 may pass.

A lamp testing socket 35 and a pair of testing terminals 35' for testing electrical devices are mounted in the end opening 16 directly below the ash tray 11. The ash tray 11 is set into the top of the opening 16. When it is removed the lamp testing socket 35 is accessible. The ash tray 11 is located to the rear of the light controlling shade 22. The package of cigarettes 12 is located to the front of the shade 22. The shade 22 is provided with several side portions 36 which have downwardly projecting dowel pins 37 engaging in complementary openings 38 formed in the base 10 by which the shade 22 is releasibly held in position. The window openings 33 are formed in these side portions 36. A switch 38 is mounted upon the base 10. An electric cable 39 enters the base 10 and connects with the sockets 17 and 35 as will be hereinafter more fully described.

The square rods 31 are disposed in cavities 40 formed in the pedestal 14. These cavities extend transversely across the pedestal. The cable 39 has a central portion 39ª turned into a coil and located in a cavity 41 disposed beneath the plate 19. With this arrangement the electrical connection is maintained to the socket 17 when the latter is in its raised position, as illustrated in Fig. 8.

The wiring diagram of the device is shown in Fig. 6. The cable 39 has its lead 39' connected with the lamp testing socket 35 and with the switch 38. From the switch 38 there is a lead 43 which is connected with the other terminal of the lamp testing socket 35 and with a lead 44 which connects with one terminal of the socket 17. The circuit is completed by the return lead 45 from the other terminal of the socket 17 to the cable 39. When the lamp 18 is mounted in the socket 17, the socket 35 is available for testing. When a lamp is engaged in the socket 35 an electric circuit will be completed, and this lamp, together with the lamp 18 in the socket 17, will light. When the switch 38 is closed the lamp 18 in the socket 17 will be illuminated.

Figure 8:
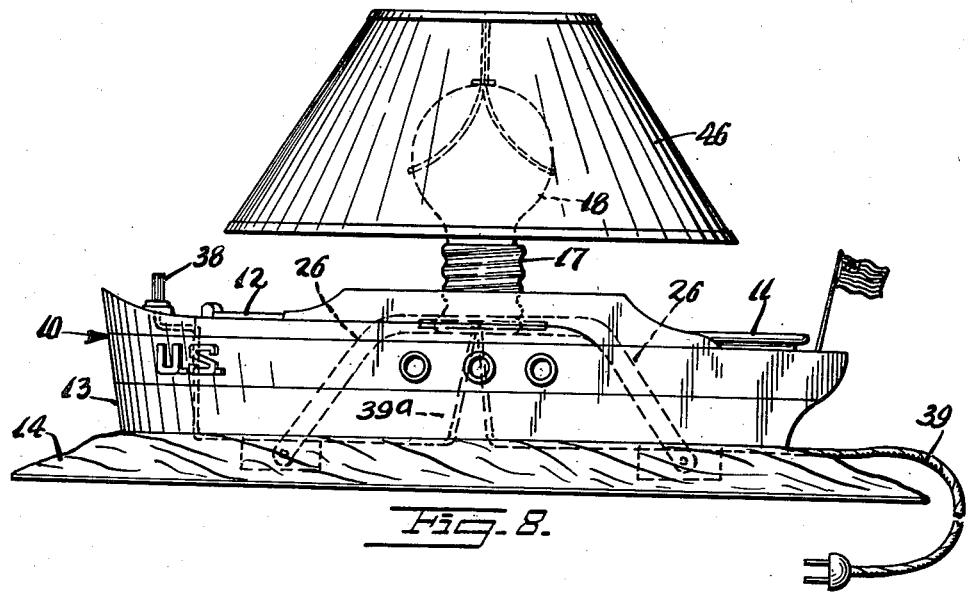
Fig. 8 is a side elevational view of the article converted into a lamp.
Figure 8:
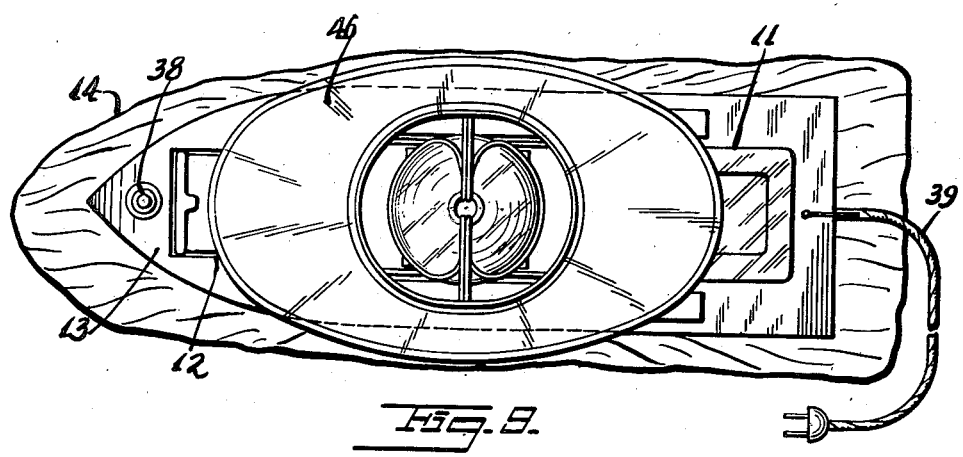
Figure 7:
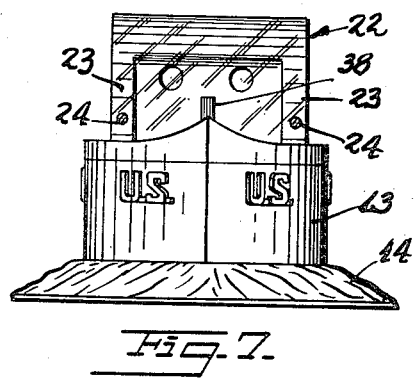
Fig. 7 is an elevational view looking in the direction of the line 7—7 of Fig. 1.

When the socket 17 is in its raised position as illustrated in Fig. 8, a conventional lamp shade 46 may be mounted upon the lamp 18 which is in the socket 17.

The operation of the device may be understood by first examining Figs. 1–7. If it is desired to convert the article into a lamp, the shade 22 must first be removed by removing the screws 24. When the shade 22 is lifted upwards the arms 26 are freed and the springs 31 will raise said arms to their up positions, as illustrated in Fig. 8. In these positions of said arms, the plate 19 was correspondingly lifted. Thus the socket 17 is now in its elevated position, as shown in Fig. 8. The lamp shade 46 may now be engaged on the lamp 18.

When desired, the lamp shade 46 may be removed and the lamp 18 pressed downwards to lower the plate 19 back to its original position. The shade 22 is then engaged over the lamp so that the portions 25 engage the arms 26 to hold them downwards. The screws 24 are re-engaged into position to hold the parts in their initial positions.

It is to be understood that the lamp testing socket 35 may be used for testing electric bulbs, fuses, or any other electrical device. The lamp shade 46 may have any desired shape and ornamentation.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A combination electric tester lamp and smoker's outfit, comprising a base supporting various smoker's articles and having a centrally located opening and an end opening extending downwards from the top, a lamp socket and lamp extendably mounted in said central opening, a lamp testing socket mounted in said end opening, a circuit connecting said sockets in series, a switch controlled circuit in parallel with said testing socket, and a light controlling shade removably mounted on said base over said central opening and holding said lamp and socket down, whereby when said shade is removed said first socket will be free to move upwards to extend said lamp above said base.

2. A combination electric tester lamp and smoker's outfit, comprising a base supporting various smoker's articles and having a centrally located opening and an end opening extending downwards from the top, a lamp socket and lamp extendably mounted in said central opening, a lamp testing socket mounted in said end opening, a circuit connecting said sockets in series, a switch controlled circuit in parallel with said testing socket, and a light controlling shade removably mounted on said base over said central opening and holding said lamp and socket down, whereby when said shade is removed said first socket will be free to move upwards to extend said lamp above said base, said shade having window openings covered with colored transparent or translucent material through which light from said lamp may pass.

3. A combination electric tester lamp and smoker's outfit, comprising a base supporting various smoker's articles and having a centrally located opening and an end opening extending downwards from the top, a lamp socket and lamp extendably mounted in said central opening, a lamp testing socket mounted in said end opening, a circuit connecting said sockets in series, a switch controlled circuit in parallel with said testing socket, and a light controlling shade removably mounted on said base over said central opening and holding said lamp and socket down, whereby when said shade is removed said first socket will be free to move upwards to extend said lamp above said base, said shade having lug portions engaged by fastening elements secured to said base for holding the shade in position.

4. A combination electric tester lamp and smoker's outfit, comprising a base supporting various smoker's articles and having a centrally located opening and an end opening extending downwards from the top, a lamp socket and lamp extendably mounted in said central opening, a lamp testing socket mounted in said end opening, a circuit connecting said sockets in series, a switch controlled circuit in parallel with said testing socket, and a light controlling shade removably mounted on said base over said central opening and holding said lamp and socket down, whereby when said shade is removed said first socket will be free to move upwards to extend said lamp above said base, said shade having lug portions engaged by fastening elements secured to said base for holding the shade in position, and said shade having downwardly directed portions for indirectly holding said lamp socket down.

5. A combination electric tester lamp and smoker's outfit, comprising a base supporting various smoker's articles and having a centrally located opening and an end opening extending downwards from the top, a lamp socket and lamp extendably mounted in said central opening, a lamp testing socket mounted in said end opening, a circuit connecting said sockets in series, a switch controlled circuit in parallel with said testing socket, and a light controlling shade removably mounted on said base over said central opening and holding said lamp and socket down, whereby when said shade is removed said first socket will be free to move upwards to extend said lamp above said base, said shade having lug portions engaged by fastening elements secured to said base for holding the shade in position and said shade having downwardly directed portions for indirectly holding said socket down, said lamp socket being slidably mounted on vertical rods, pivotally mounted levers being connected with said lamp socket, resilient means urging said levers into raised positions to raise said lamp socket, and said downwardly directed portions of said shade engaging said levers.

6. A combination electric tester lamp and smoker's outfit, comprising a base supporting various smoker's articles and having a centrally located opening and an end opening extending downwards from the top, a lamp socket and lamp extendably mounted in said central opening, a lamp testing socket mounted in said end opening, a circuit connecting said sockets in series, a switch controlled circuit in parallel with said testing socket, and a light controlling shade removably mounted on said base over said central opening and holding said lamp and socket down, whereby when said shade is removed said first socket will be free to move upwards to extend said lamp above said base, said switch being mounted on said base.

RAYMOND ZUAZUA.